(12) United States Patent
Ishii (10) Patent No.: US 9,164,684 B1
(45) Date of Patent: Oct. 20, 2015

(54) MAGNETIC DISC DRIVE AND METHOD OF RECOVERING RECORDED DATA

(71) Applicant: Kabushiki Kaisha Toshiba, Minato-ku, Tokyo (JP)

(72) Inventor: Koji Ishii, Fujisawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/318,078

(22) Filed: Jun. 27, 2014

Related U.S. Application Data (60) Provisional application No. 61/977,287, filed on Apr. 9, 2014.

(51) Int. Cl.
*G11B 5/09* (2006.01)
*G06F 3/06* (2006.01)
*G11B 20/10* (2006.01)

(52) U.S. Cl.
CPC ............ *G06F 3/0619* (2013.01); *G06F 3/0656* (2013.01); *G06F 3/0676* (2013.01); *G11B 20/10222* (2013.01); *G06F 2003/0692* (2013.01)

(58) Field of Classification Search
CPC .... G11B 27/36; G11B 20/10009; G11B 5/09; G11B 2220/90; G11B 20/1426; G11B 5/012; G11B 5/035
USPC ............... 360/65, 31, 39, 40, 53, 48
See application file for complete search history.

(56) References Cited

U.S. PATENT DOCUMENTS

| 7,483,478 | B2 | 1/2009 | Kikugawa et al. |
| 7,643,238 | B2 * | 1/2010 | DeGroat ......................... 360/65 |
| 8,356,206 | B2 | 1/2013 | Koester |

FOREIGN PATENT DOCUMENTS

JP 2005-071435 A 3/2005

\* cited by examiner

*Primary Examiner* — Nabil Hindi
(74) *Attorney, Agent, or Firm* — White & Case LLP (57) ABSTRACT

According to one embodiment, a magnetic disk drive includes a read/write channel configured to process a read/write signal with respect to a magnetic disk, a data refresh module configured to perform a rewrite for refreshing recorded data on the magnetic disk, a data capture module configured to capture read data in the read/write channel, a timing determination module configured to determine power shutdown timing during the rewriting from the read data, and a data recovery module configured to recover the read data by dividing the read data into two items based on the power shutdown timing, shifting timing of one item of the read data, and combining the shifted data with the other item of the read data.

20 Claims, 10 Drawing Sheets

MAGNETIC DISC DRIVE AND METHOD OF RECOVERING RECORDED DATA

CROSS-REFERENCE TO RELATED APPLICATIONS

This application claims the benefit of U.S. Provisional Application No. 61/977,287, filed Apr. 9, 2014, the entire contents of which are incorporated herein by reference.

FIELD

Embodiments described herein relate generally to a magnetic disk drive and a method of recovering recorded data.

BACKGROUND

In a magnetic disk drive, typically a hard disk drive, side fringe (influence of a leakage magnetic field over a magnetic recording medium) may be a cause of data erase in adjacent tracks. To counter this, track refresh by rewriting recorded data has been adopted. If power is shut down during a write operation in the track refresh, a write splice caused by the power shutdown (a redundancy area for a signal to settle to an active level: write-joint) is occurred, and a sector which cannot be read is remained.

In order to avoid the above problem, when track refresh is performed, at first data is saved in a temporary storage area and then the data sector is rewritten. However, since the temporary storage area exists at a specific part of the recording medium, this technique entails a seek operation to reach the temporary storage area. Consequently, it takes a long time to perform the refresh operation, and the performance of the magnetic disk drive is thereby degraded.

DETAILED DESCRIPTION

In general, according to one embodiment, a magnetic disk drive comprises a read/write channel configured to process a read/write signal with respect to a magnetic disk, a data refresh module configured to perform a rewrite for refreshing recorded data on the magnetic disk, a data capture module configured to capture read data in the read/write channel, a timing determination module configured to determine power shutdown timing during the rewriting from the read data, and a data recovery module configured to recover the read data by dividing the read data into two items based on the power shutdown timing determined by the timing determination module, shifting timing of one item of the read data, and combining the shifted data with the other item of the read data.

Embodiment

The magnetic disk drive and a method of recovering recorded data according to the embodiment will now be described.

[Structure of Disk Drive]

Figure 1:
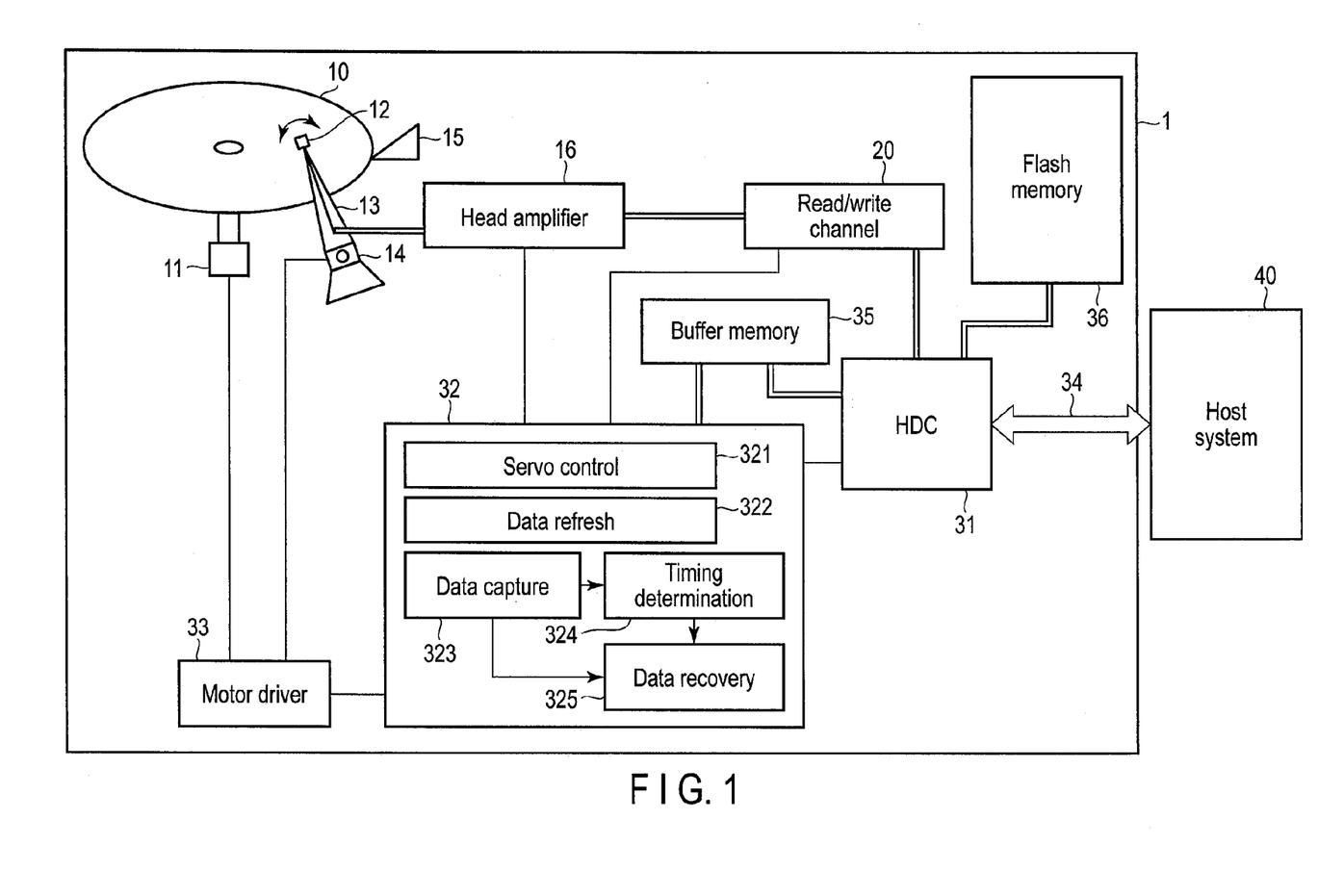
FIG. 1 is a block diagram illustrating a structure of a magnetic disk drive according to an embodiment.

FIG. 1 is a block diagram showing a structure of the magnetic disk drive according to the embodiment. In FIG. 1, a thin line indicates a control signal line, and a block line (double line) indicates a data transmission line.

A hard disk drive (HDD) 1 as a magnetic disk drive comprises a magnetic disk 10 which is a data recording medium, a spindle motor (SPM) 11 configured to rotate the magnetic disk 10, a magnetic head 12, an actuator 13 on which the magnetic head 12 is mounted, and a ramp 15.

In magnetic disk 10, a number of tracks (cylinders) are provided for a user area. The actuator 13 is configured to move the magnetic head 12 over the magnetic disk 10 radially by a voice coil motor (VCM) 14. The magnetic head 12 includes a read head for reading data from the magnetic disk 10, and a write head for writing data to the magnetic disk 10. The ramp 15 is a member for holding the magnetic head 12 which has been retracted from the magnetic disk 10 at a non-operating time.

Further, the HDD 1 comprises a head amplifier 16, a read/write channel 20, a hard disk controller (HDC) 31, a processor (central processing unit [CPU]) 32, and a motor driver 33. The head amplifier 16 amplifies a read signal read by the read head of the magnetic head 12 and transmits the amplified signal to the read/write channel 20. In addition, the head amplifier 16 converts write data output from the read/write channel 20 into a write current, and transmits the write current to the write head of the magnetic head 12.

The read/write channel 20 is a signal processing unit for processing of read/write data signals. The read/write channel 20 demodulates recorded data from the read signal, and also modulates (encodes) the write data. The HDC 31 is connected to a host system (a personal computer or digital equipment) 40 via an interface bus 34, and controls transfer of commands and data between the HDD 1 and the host system 40. The HDC 31 also controls the read/write operation of the read/write channel 20.

The CPU 32 is a main controller of the HDD 1, and executes head positioning control (servo control processing 321). Also, the CPU 32 executes data refresh processing 322 to be described later in cooperation with the HDC 31, and further executes data capture processing 323, timing determination processing 324, and data recovery processing 325 to be described later. The motor driver 33 includes an SPM driver which supplies a driving current to the SPM 11, and a VCM driver which supplies a driving current to the VCM 14.

It should be noted that the CPU 32, the HDC 31, and the read/write channel 20 are formed by a single chip. Further, as a memory group, the HDD 1 comprises a DRAM buffer memory 35, and a flash memory 36. The buffer memory 35 stores the read/write data to be transferred to/from the host system 40. The flash memory 36 is a memory for storing data.

Figure 2:
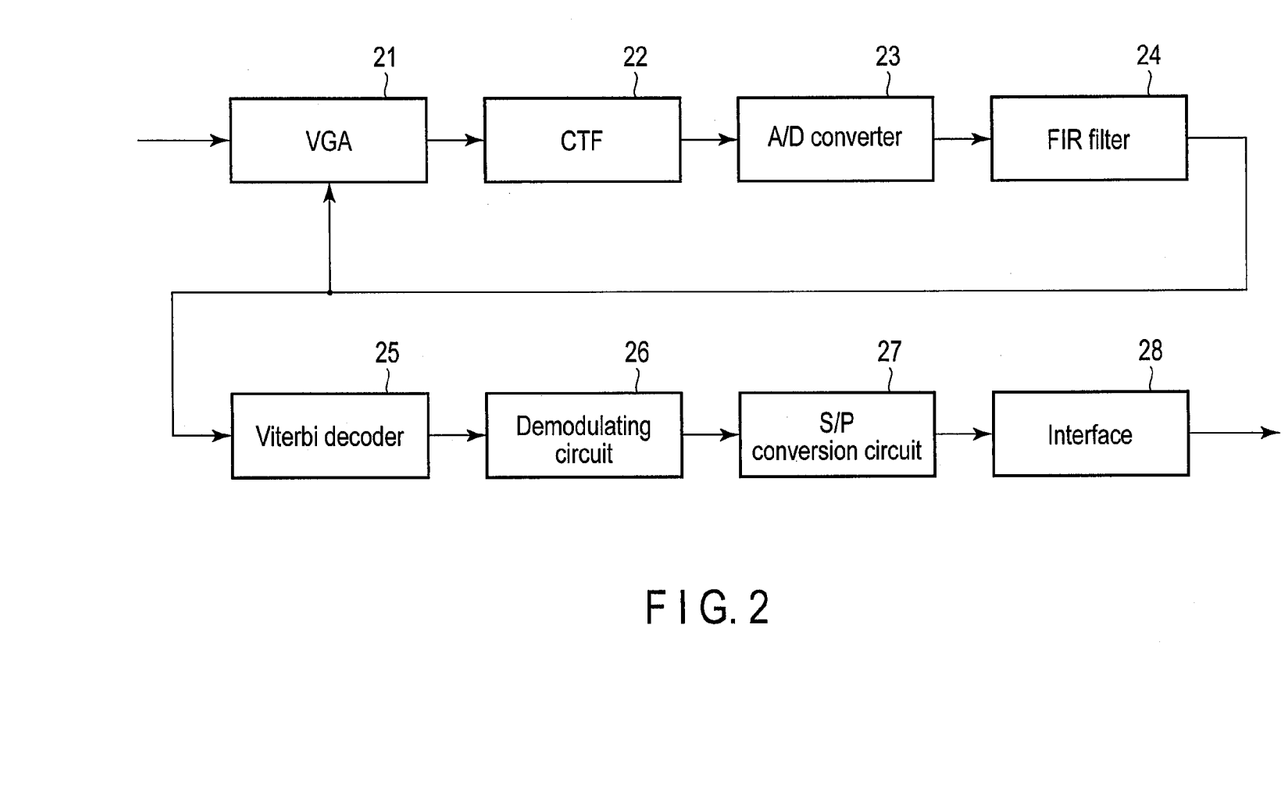
FIG. 2 is a block diagram illustrating a structure of a read system of a read/write channel for use in the magnetic disk drive of FIG. 1.

FIG. 2 is a block diagram showing an example of a structure of a read system of the read/write channel 20.

A reproduction signal amplified by the head amplifier 16 is input to a variable gain control (VGA) 21. The VGA constitutes automatic gain control (AGC), and an input voltage is kept to a constant voltage (for example, 1 to 2V). An output of the VGA 21 is input to a continuous time filter (CTF) 22 formed of a low-pass filter (LPF) in which a group delay is constant. The CTF 22 is one of the type which can change a broad gain by program, and serves to not only remove noise, but also perform waveform equalization, which is to slim a waveform having wide skirts.

After an output of the CTF 22 has been quantized and converted into digital data by an A/D converter 23, the digital data is subjected to waveform equalization again by a finite impulse response (FIR) filter 24. A waveform (FIR data) equalized by the FIR filter 24 is processed by a Viterbi decoder 25, and a run-length limited (RLL) signal is output. A coded RLL signal is demodulated into the original signal by a demodulating circuit 26, and converted into parallel data by a serial-parallel conversion circuit 27. Further, the converted parallel data is to be transferred to the HDC 31 via an interface 28.

(Track Refresh Processing)

With reference to the waveforms illustrated in FIGS. 3 to 9, and the flowchart of FIG. 10, track refresh and data recovery processing of the present embodiment will be described. The processing of the above two types is basically performed by arithmetic processing of the CPU 32.

As described above, the magnetic disk drive of the present embodiment comprises a rotation mechanism of the magnetic disk 10 (the SPM 11 and the motor driver 33), an actuation mechanism of the magnetic head 12 (the actuator 13 and the VCM 14), the read/write channel 20 which processes the read/write signal with respect to the magnetic disk 10, the HDC 31 which is connected to the host system 40 and controls transfer of various commands and data, and also controls the read/write operation of the read/write channel 20, and the CPU 32 which controls the read/write channel 20, the HDC 31, and other various mechanisms. Further, the CPU 32 is configured to perform the servo control processing 321 with respect to the magnetic head 12, the data refresh processing 322 of performing rewriting for data refresh with respect to the magnetic disk 10, the data capture processing 323 of capturing the FIR data in the read/write channel 20, the timing determination processing 324 of determining power shutdown timing in the rewriting based on the signal (FIR data, PLL waveform) obtained in the read/write channel 20, and the data recovery processing 325 of recovering the FIR data by dividing the FIR data into two parts as an FIR data item before the determined power shutdown timing and an FIR data item after the determined power shutdown timing, shifting the timing of one of the FIR data items, and combining the shifted FIR data item with the other FIR data item.

While track refresh processing in the data refresh processing 322 can be performed per track, it should preferably be performed per area in which a plurality of tracks are grouped together. In the present embodiment, an example in which the data refresh processing is performed per track will be described for simplicity. However, the technique can similarly be applied to a method of performing the data refresh processing for grouped tracks.

Figure 3:
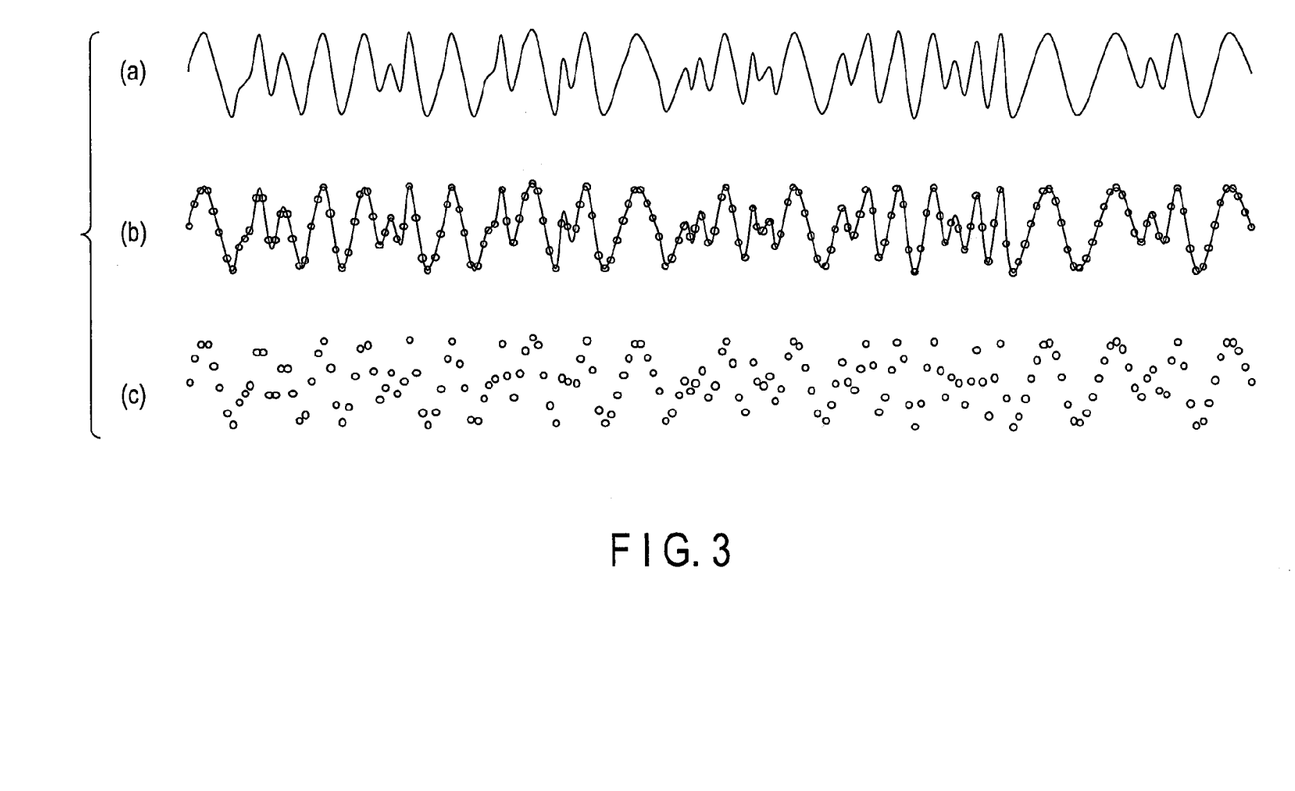
FIG. 3 is an illustration of a normal sector waveform and sampling data.

As in FIG. 3, as regards reproduced waveform (a) of normal sectors of the magnetic disk 10, data (b) and (c) which are written by the track refresh are the same. Here, (b) of FIG. 3 represents FIR data (data in which adjacent sampling points are connected by a virtual line) obtained via the FIR filter 24 of the read/write channel 20, and (c) similarly represents the FIR data (but without a virtual line).

Figure 4:
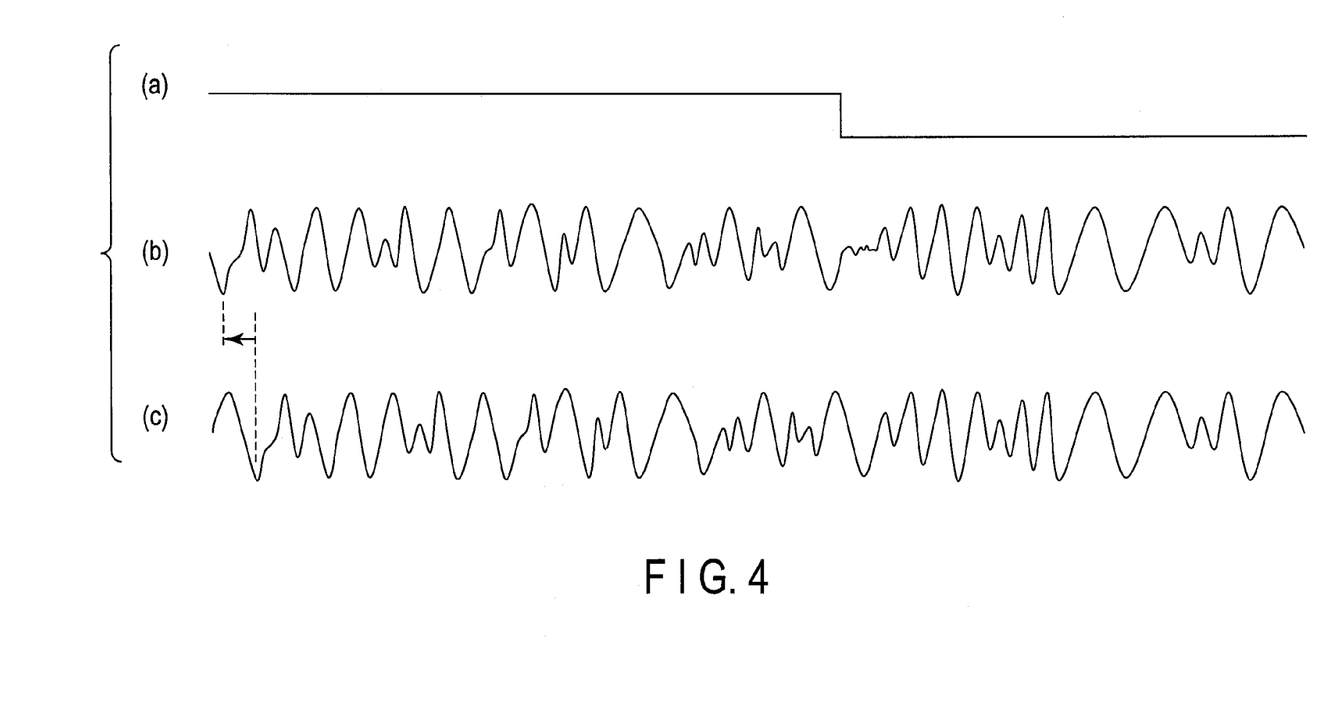
FIG. 4 is an illustration of a sector waveform when power shutdown has occurred.

As can be seen from FIG. 3, the data to be written is exactly the same when compared to the reproduced waveform of the original sectors. However, because of signal jitter and rotation jitter, the timing at which the writing is performed is different from that of the previous writing. Accordingly, as shown in FIG. 4, when power shutdown has occurred during track refresh, continuous data cannot be obtained because of a write stop by the power shutdown. In FIG. 4, (a) indicates an operating waveform of a write gate, (b) indicates a reproduced waveform of sectors subjected to power shutdown, and (c) indicates a reproduced waveform of the original sectors. Note that FIG. 4 shows an example in which the writing is performed at timing leading the timing of the original data by the signal jitter in performing the rewriting for refresh.

Figure 5:
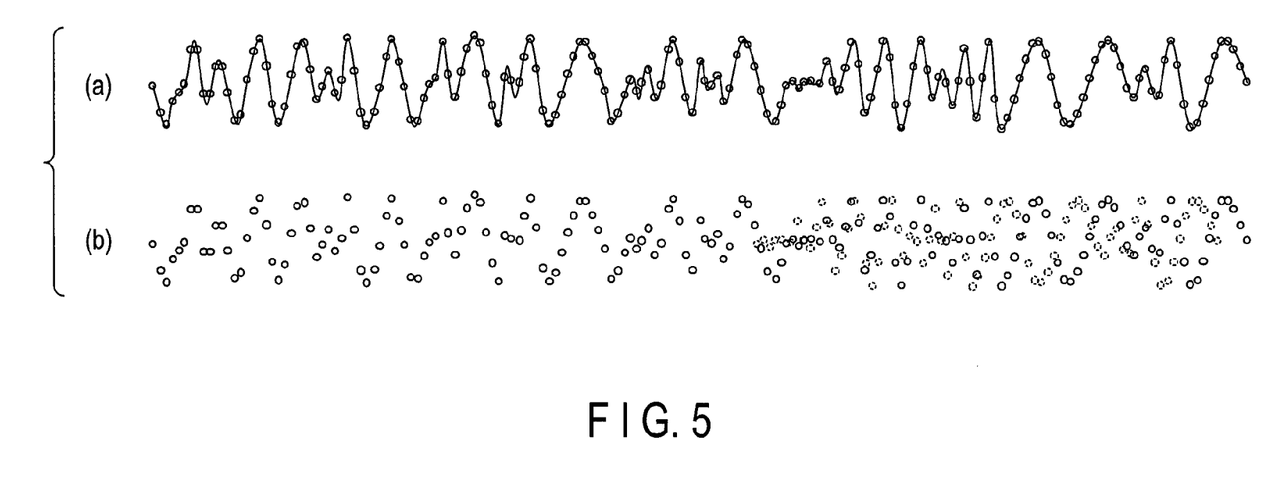
FIG. 5 is an illustration of sampling data of sectors when power shutdown has occurred.

In this case, as shown in (a) and (b) of FIG. 5, the FIR data is not normal, and data after a write splice cannot be recovered. Therefore, a read error occurs. Of round signs of the FIR data in (b) of FIG. 5, signs in a solid line indicate FIR data which could be actually obtained, and signs in a broken line indicate FIR data which should have been obtained.

Meanwhile, the recent read channel 20 is provided with a function of capturing FIR data and performing signal processing, thereby improving an error recovery capability (i.e., FIR averaging and ITI cancellation). However, even if such a function is provided, if there is a write splice as described above, timing is shifted so that the timing becomes different from that of the original FIR data. Therefore, decoding cannot be performed normally.

Thus, in the present embodiment, data is recovered by using a capture function of the FIR data. That is, by using the FIR data, a write-joint sector which has been incurred by power shutdown during refresh is recovered, and by eliminating temporary storage of data, the performance is improved.

Figure 10:
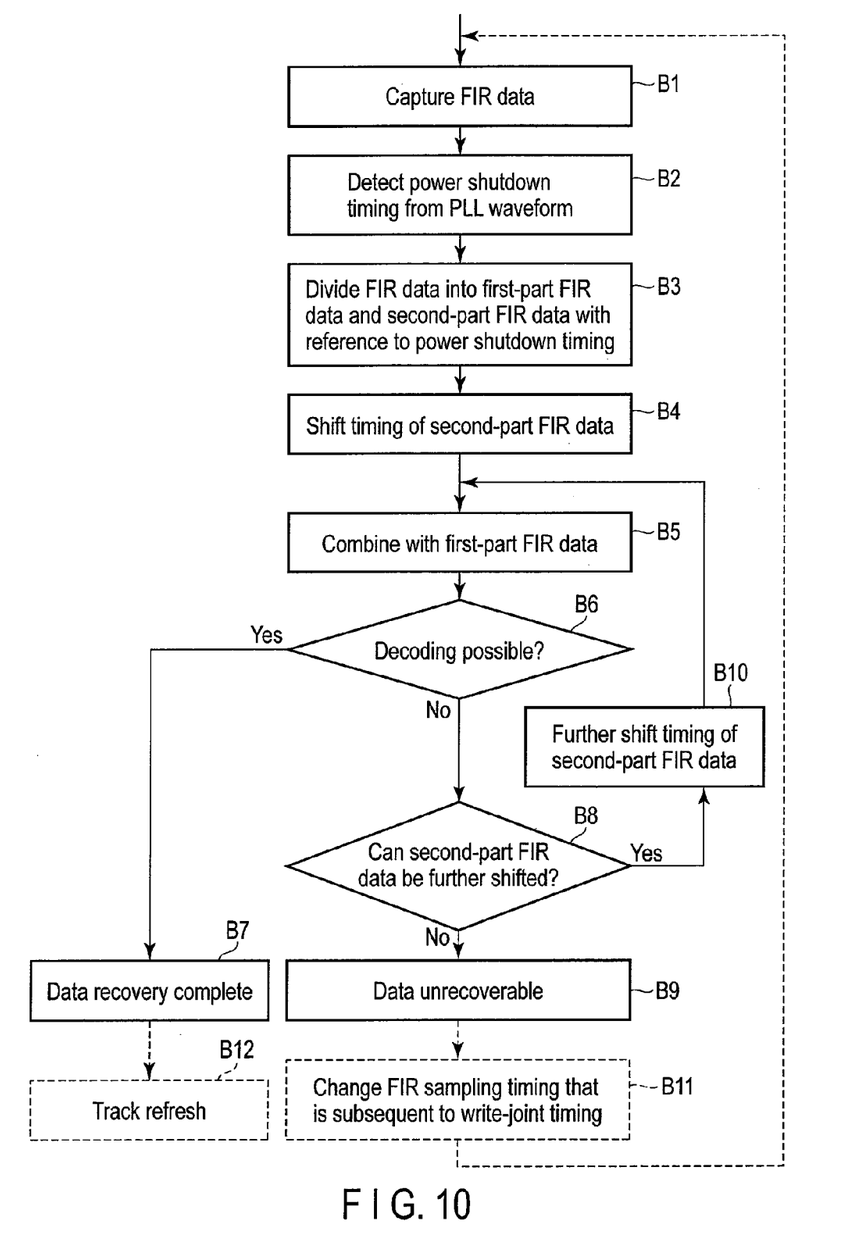
FIG. 10 is a flowchart for explaining a data recovery operation according to the embodiment.

More specifically, as shown in the flowchart of FIG. 10, firstly, FIR data, which is the output of the FIR filter 24 of the read/write channel 20, is captured in response to the instruction of the CPU 32 (block B1). In parallel with this, a phase-locked loop (PLL) waveform of a feedback loop of the read/write channel 20 is captured.

Figure 6:
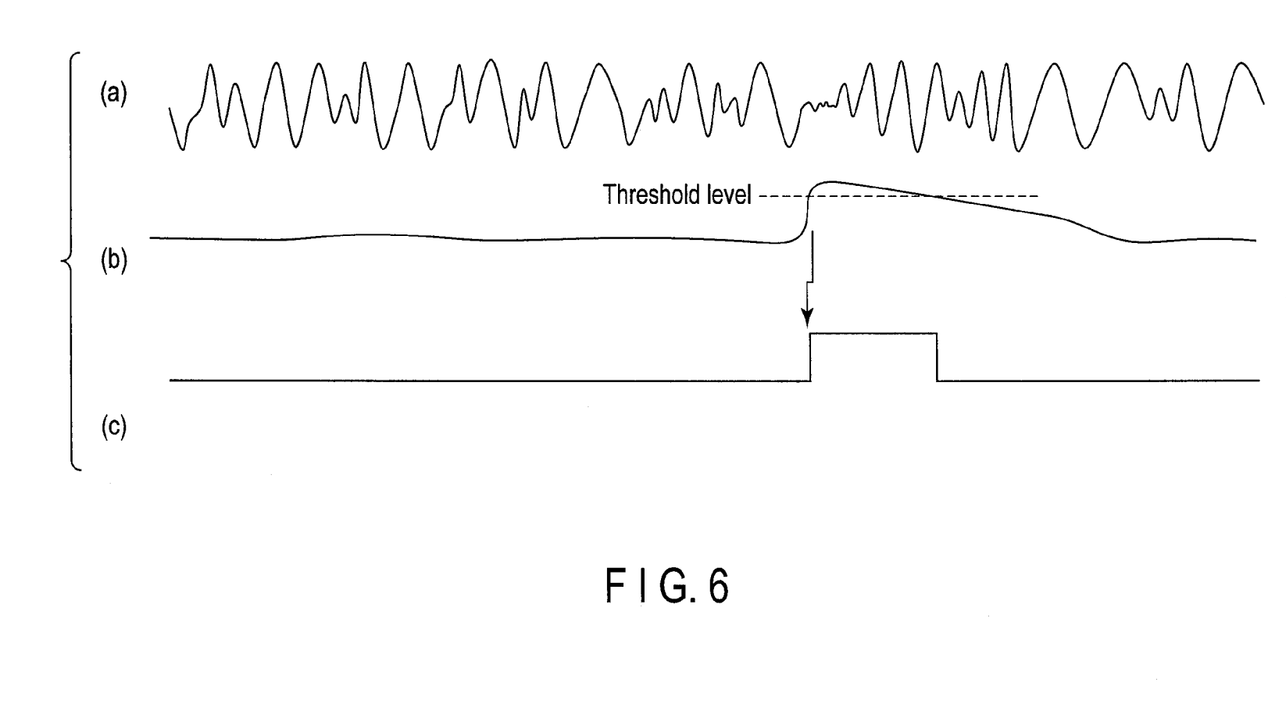
FIG. 6 is an illustration of a PLL waveform and a power shutdown determination signal of sectors when power shutdown has occurred.

For a track in which a write-joint has been incurred by power shutdown during refresh, as shown in FIG. 6, timing of data is greatly shifted before and after the power shutdown. Therefore, the PLL cannot follow. Thus, the power shutdown timing is detected from the PLL waveform (block B2). More specifically, a waveform regarding the PLL is compared with a threshold level which would not be exceeded at normal times, and a power shutdown occurrence determination signal is generated at the timing of exceeding this threshold level. This signal timing assumes a write splice by power shutdown. It should be noted that (a) of FIG. 6 indicates a reproduced waveform of sectors subjected to power shutdown, (b) indicates the PLL waveform, and (c) indicates the power shutdown occurrence determination signal.

Figure 7:
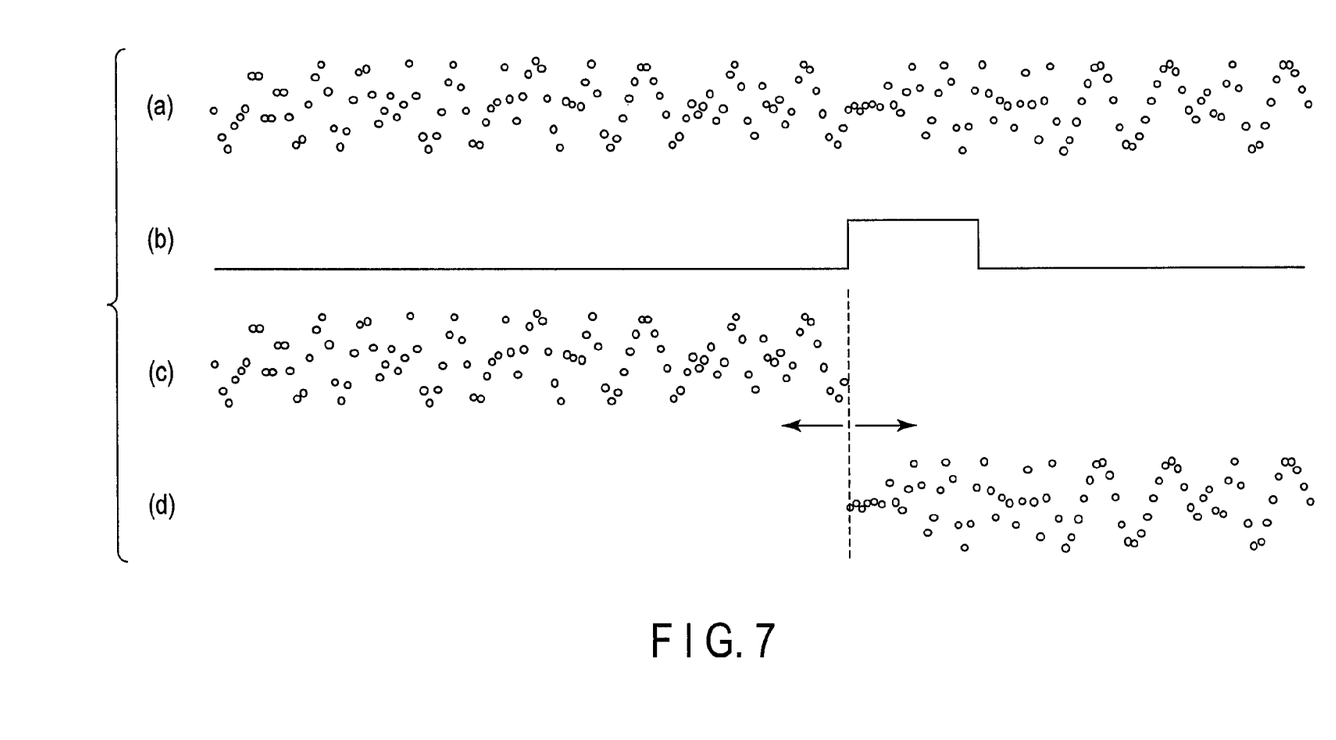
FIG. 7 is an illustration for explaining a method of recovering sectors (division) when power shutdown has occurred.

Next, as shown in FIG. 7, the FIR data is divided into an FIR data item before output of the power shutdown occurrence determination signal and that after output of the power shutdown occurrence determination signal (block B3). That is, the first part prior to a write-joint, which is before the power shutdown, is read normally, and the FIR data is stored in the buffer memory 35. As regards the second part subsequent to the write-joint, which is after the power shutdown, the phase does not match. Therefore, the second part is read in a PLL-fixed state, and the FIR data which has been read is stored in the buffer memory 35. Since the PLL jumps (i.e., PLL lock is lost) at the write-joint timing, the FIR data is divided at this timing.

In FIG. 7, (a) indicates the FIR data, (b) indicates the power shutdown occurrence determination signal, (c) indicates the FIR data before the power shutdown timing, and (d) indicates the FIR data after the power shutdown timing. If the second part after the write-joint is read by a normal procedure, there are cases where the reading is unsuccessful because of a timing mismatch with the first part. For this reason, it is effective to deactivate the following (tracking) of PLL, adaptive-FIR, AGC, etc., and capture the FIR data in a state where they are fixed. If reading can be sufficiently performed by the normal procedure, fixing of the above is not necessarily required.

Figure 8:
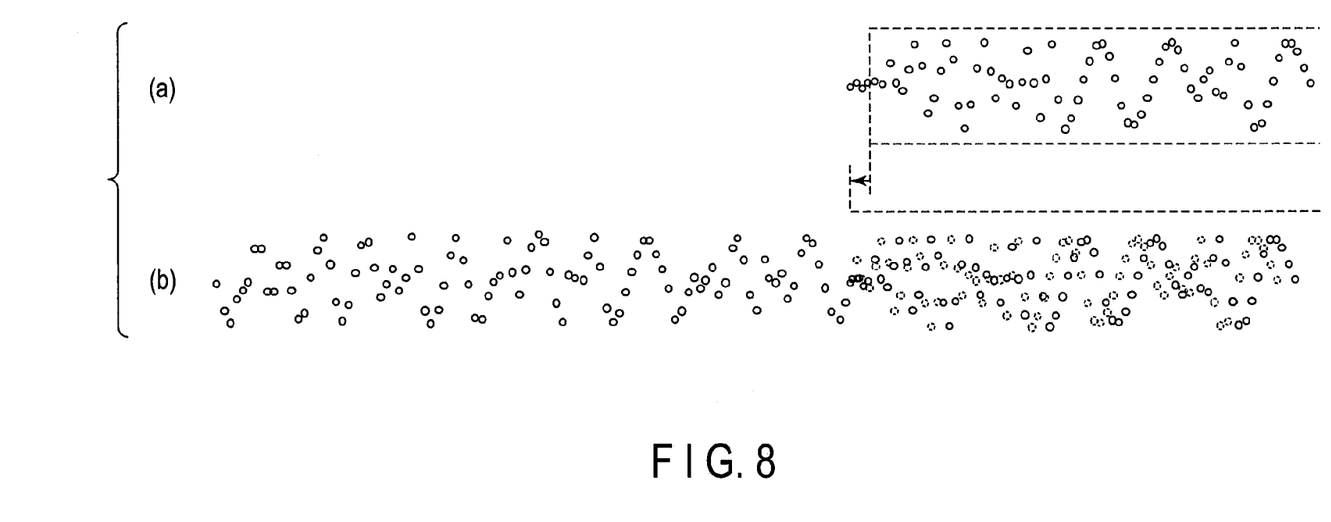
FIG. 8 is an illustration for explaining a method of recovering sectors (synthesis) when power shutdown has occurred.

Next, as shown in FIG. 8, the timing of the second part of the FIR data is shifted (block B4) and the second part of the FIR data is combined with the first part of the FIR data (block B5). In FIG. 8, (a) indicates the FIR data after the power shutdown timing, and (b) indicates the combined FIR data. Further, it is determined whether re-decoding is possible (block B6). When it is determined that decoding is possible in block B6, data recovery is completed (block B7). In the case of FIG. 8, since the timing of the sampling data after power shutdown (solid line circles) does not match that of the sampling data in a normal state (broken line circles), decoding cannot be performed.

Figure 9:
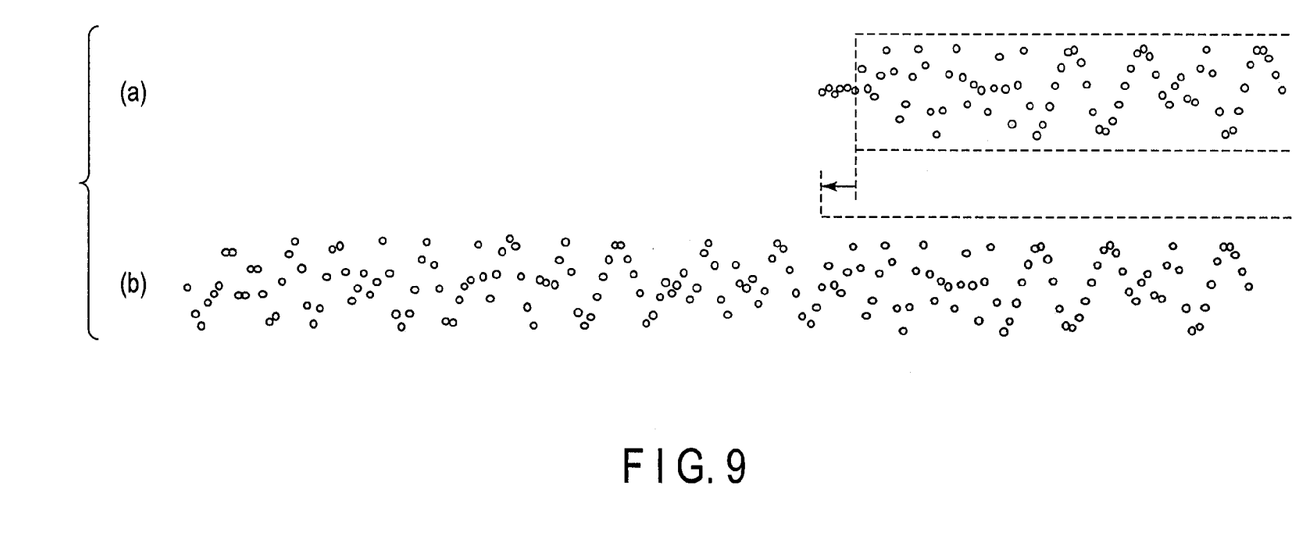
FIG. 9 is an illustration for explaining another method of recovering sectors (synthesis) when power shutdown has occurred.

When the decoding is not possible as in the case of FIG. 8, it is determined whether the second-part FIR data can be further shifted (block B8). If it is determined that the second-part FIR data cannot be shifted, it is assumed that data recovery is impossible (block B9). If it is determined that the second-part FIR data can be further shifted, the timing is further changed, as shown in FIG. 9 (block B10). Then, the processing goes back to block B5, and the second-part FIR data is combined with the first-part FIR data to attempt re-decoding. It should be noted that (a) of FIG. 9 indicates the FIR data after the power shutdown timing, and (b) indicates the combined FIR data. Further, in (b) of FIG. 9, since the timing of the combined FIR data (solid line circles) matches that of the FIR data in a normal state (broken line circles), broken lines are not seen.

In the case of FIG. 9, since the FIR data could be combined with the same timing as the normal sector, decoding is enabled and the data can be recovered. In this example, while the timing shift is carried out twice, data recovery may be attempted by performing data synthesis while changing the timing within the range of consideration to the timing jitter. Further, the recovered FIR data is fed back to the read/write channel 20, and is to be processed by the Viterbi decoder 25.

In the example described above, while the timing of the second-part FIR data is shifted, as shown in FIGS. 8 and 9, the timing of the first-part FIR data may be shifted.

Further, when it is assumed that the data recovery is impossible in block B9, that is, parity of ECC does not match and the data cannot be recovered, the FIR sampling timing which is after the write-joint timing is changed (block B11). Then, the processing is returned to block B1 to acquire the FIR data again, and divide and combine the acquired FIR data. The processing is continued until parity is matched. The sectors involved after power shutdown may not be able to capture data at the same phase as the original write timing by performing the capture only once. In this case, it is effective to capture the data by changing the timing of the FIR sampling, perform synthesis by moving the capture timing of the FIR data and the data synthesis timing, and recover the data by repeating the above.

In track refresh, recovery of data is possible since the data before writing and the data after writing are exactly the same. If such recovery operation is performed for data affected by power shutdown occurred during a normal sector write, which is not track refresh, the data is different before and after the writing, and thus parity does not match between the two and decoding cannot be performed. Accordingly, even if track refresh as in the present embodiment is carried out, abnormal data will not be recovered. In other words, since the parity does not match, data other than those for refresh will not be recovered erroneously.

If data recovery is completed, the track in question is rewritten by the recovered data (block B12). In this way, a track having an abnormality in a write-joint due to power shutdown can be corrected to a track with no abnormal write-joint. Rewriting for the purpose of write-joint correction is not necessarily required. However, if this is performed, it becomes unnecessary to perform the processing of division, synthesis, decoding, etc., of the FIR data by subsequent reading with respect to a track having a write-joint abnormality caused by power shutdown. That is, access speed for a magnetic disk can be improved.

As can be seen, according to the present embodiment, data is recovered by combining the FIR data before power shutdown and that after power shutdown, which enables to recover a write-joint sector which has been incurred by power shutdown during refresh.

That is, since the PLL jumps at the write-joint timing, FIR data before power shutdown and that after power shutdown are combined based on this timing, and the recovery is performed. When the parity does not match, the recovery is performed by a channel while shifting the second-part FIR data within the expected range. If the recovery is not possible, the FIR sampling timing which is after the write-joint timing is changed to read a medium and acquire the FIR data, and the synthesis described above is repeated. The processing is repeated until parity matches. In this way, recovery of the write-joint sector, which is incurred by power shutdown during refresh, is enabled.

Moreover, since temporary storage for power shutdown becomes unnecessary, it is possible to prevent the performance from being degraded by a seek operation performed to reach a temporary storage area.

Accordingly, it is possible to realize a magnetic disk drive which reduces performance deterioration by a refresh operation, that is, a magnetic disk drive with improved performance.

(Modification)

The present invention is not limited to the embodiment described above.

In the present embodiment, data recovery was performed by dividing and storing the FIR data under control of the CPU, and further shifting the FIR data of the second part so that it is combined with the FIR data of the first part. However, the technique is not limited to the above. For example, by adding a new function to a read channel of the read/write channel 20, storage of the FIR sampling data of the first part is unnecessary, and data recovery can be realized by a simpler firmware structure.

The substance of the new function to be added to the read channel is the function of automatically triggering the timing at which the PLL changes suddenly, changing capture timing of the FIR data after that timing in accordance with the amount of shift caused by power shutdown, and further changing the timing setting every time the read operation is performed. Timing variable time may be the function of allowing automatic operation by setting a width and a step. If such functions are provided, storing FIR data becomes unnecessary, and it is possible to obtain FIR data which does not include a write-joint by a one-time read, and directly perform decoding processing for the read FIR data by the Viterbi decoder 25, etc.

Further, in the present embodiment, as shown in FIG. 4, an example was provided to describe that in performing the rewriting of refresh, the writing is performed at a timing that leads the timing of the original data by signal jitter. However, the present embodiment is not limited to the above, and can be applied to a case where writing is performed at a timing that lags the timing of the original data. If the original data is written at a later timing, data existing immediately before power shutdown will be lost. However, if the data to be lost is only a little, an error correction function incorporated in the read/write channel 20 and the HDC 31 can make the correction.

Further, in the present embodiment, an example of performing refresh per track has been described. However, the technique can also be applied to the case of performing the refresh per grouped sectors, not necessarily limited to units of tracks.

Furthermore, in the present embodiment, the processing of capturing data from the read/write channel, the timing determination processing of determining the power shutdown timing, and the processing of recovering the read data are executed by the CPU. However, these types of processing may be configured by dedicated hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

(Supplementary Note)

The magnetic disk drive comprises a rotation mechanism configured to rotate a magnetic disk, an actuation mechanism configured to actuate a magnetic head which writes data on the magnetic disk and reads data therefrom, a read/write channel configured to process a read/write signal with respect to the magnetic disk, and a processor configured to control the read/write channel and each of the mechanisms.

The processor executes data refresh processing of performing rewriting for data refresh with respect to the magnetic disk, data capture processing of capturing FIR data in the read/write channel, timing determination processing of determining power shutdown timing which has occurred during the execution of rewriting based on the FIR data, data recovery processing of recovering the FIR data by dividing the FIR data into two parts as an FIR data item before the determined power shutdown timing and an FIR data item after the determined power shutdown timing, shifting the timing of one of the FIR data items, and combining the shifted FIR data item with the other FIR data item.

What is claimed is:

1. A magnetic disk drive, comprising:
a read/write channel configured to process a read/write signal with respect to a magnetic disk;
a data refresh module configured to perform a rewrite for refreshing recorded data on the magnetic disk;
a data capture module configured to capture read data in the read/write channel;
a timing determination module configured to determine power shutdown timing during the rewriting from the read data; and
a data recovery module configured to recover the read data by dividing the read data into two items based on the power shutdown timing determined by the timing determination module, shifting timing of one item of the read data, and combining the shifted data with the other item of the read data.

2. The magnetic disk drive of claim 1, further comprising a processor configured to execute each kind of processing by the data refresh module, the data capture module, the timing determination module, and the data recovery module.

3. The magnetic disk drive of claim 1, wherein the data refresh module is configured to rewrite the recorded data in units of tracks.

4. The magnetic disk drive of claim 1, wherein the read/write channel comprises an A/D converter configured to convert an analog signal read from the magnetic disk into a digital signal, an FIR filter configured to perform waveform equalization with respect to the digital signal, and a decoder configured to decode FIR data to be obtained after the data has passed through the FIR filter, and wherein
the data capture module is configured to capture the FIR data to be obtained after the data has passed through the FIR filter.

5. The magnetic disk drive of claim 1, wherein the read/write channel comprises an A/D converter configured to convert an analog signal read from the magnetic disk into a digital signal, an FIR filter configured to perform waveform equalization with respect to the digital signal, and a decoder configured to decode FIR data to be obtained after the data has passed through the FIR filter, and wherein
the data capture module is configured to capture the digital signal obtained via the A/D converter.

6. The magnetic disk drive of claim 1, wherein the timing determination module is configured to detect timing at which a waveform regarding PLL in the read/write channel exceeds a predetermined threshold.

7. The magnetic disk drive of claim 1, wherein the data recovery module is configured to shift timing of the read data which is later than the power shutdown timing, thereby combining the shifted data with the read data before the power shutdown timing.

8. The magnetic disk drive of claim 7, wherein the data recovery module is configured to combine the read data while changing the timing of the read data which is later than the power shutdown timing within a range of consideration to timing jitter.

9. The magnetic disk drive of claim 4, wherein the data capture module is configured to capture the FIR data in a state where PLL in the read/write channel is deactivated after the power shutdown timing.

10. The magnetic disk drive of claim 4, wherein the data capture module is configured to capture the FIR data while changing sampling timing of the FIR filter in the read/write channel after the power shutdown timing.

11. A magnetic disk drive, comprising:
a read/write channel configured to process a read/write signal with respect to a magnetic disk;
a data refresh module configured to perform a rewrite for refreshing recorded data on the magnetic disk;
a timing detection module provided in the read/write channel and configured to detect power shutdown timing during the rewriting from read data in the channel; and
a timing setting module provided in the read/write channel, and configured to set variable time of capture timing of the read data which is after the power shutdown timing, and to change the variable time of the timing every time a read operation is performed.

12. The magnetic disk drive of claim 11, wherein the data refresh module is configured to rewrite the recorded data in units of tracks.

13. The magnetic disk drive of claim 11, wherein the read/write channel comprises an A/D converter configured to convert an analog signal read from the magnetic disk into a digital signal, an FIR filter configured to perform waveform equalization with respect to the digital signal, and a decoder configured to decode FIR data to be obtained after the data has passed through the FIR filter, and wherein the read data comprises the FIR data to be obtained by passing the data through the FIR filter.

14. The magnetic disk drive of claim 11, wherein the timing detection module is configured to detect timing at which a waveform regarding PLL in the read/write channel exceeds a predetermined threshold.

15. A method of recovering recorded data, comprising:
processing data recorded on a magnetic disk by a read/write channel;
capturing read data obtained from the read/write channel;
determining power shutdown timing during rewriting for refresh of the recorded data on the magnetic disk from the read data;
dividing the read data into two items based on the power shutdown timing; and
recovering the read data by shifting timing of one item of the divided read data, and combining the shifted data with the other item of the read data.

16. The method of claim 15, wherein the determining comprises detecting timing at which a waveform regarding PLL in the read/write channel exceeds a predetermined threshold.

17. The method of claim 15, wherein the recovering comprises shifting timing of the read data which is later than the power shutdown timing, thereby combining a shifted data with the read data before the power shutdown timing.

18. The method of claim 15, wherein the read/write channel comprises an A/D converter configured to convert an analog signal read from the magnetic disk into a digital signal, an FIR filter configured to perform waveform equalization with respect to the digital signal, and a decoder configured to decode FIR data to be obtained after the data has passed through the FIR filter, and wherein the read data comprises the FIR data to be obtained after the data has passed through the FIR filter.

19. The method of claim 18, wherein the capturing comprises capturing the FIR data by changing timing of FIR sampling after the power shutdown timing.

20. The method of claim 15, wherein the magnetic disk is rewritten in accordance with the recovered read data after the read data has been recovered.

* * * * *